UNITED STATES PATENT OFFICE.

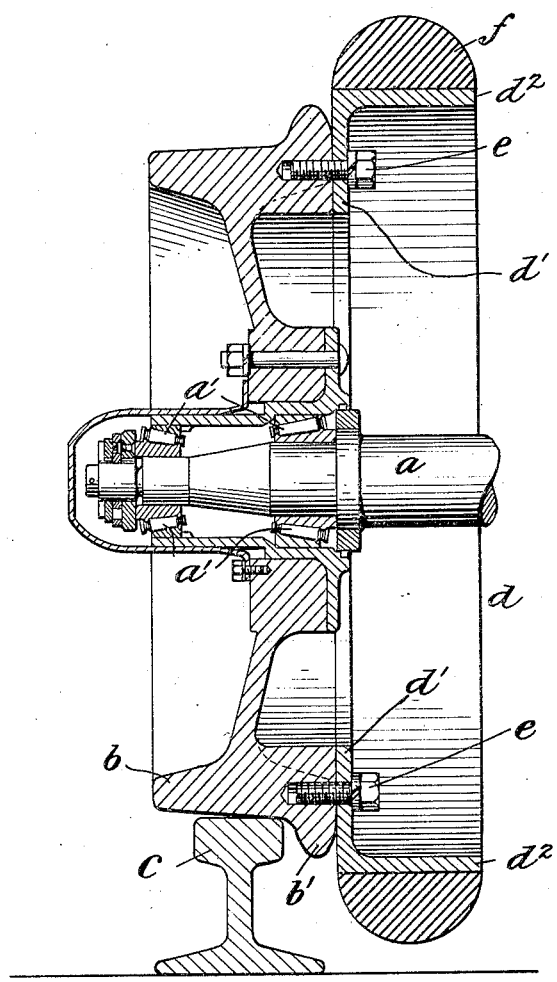

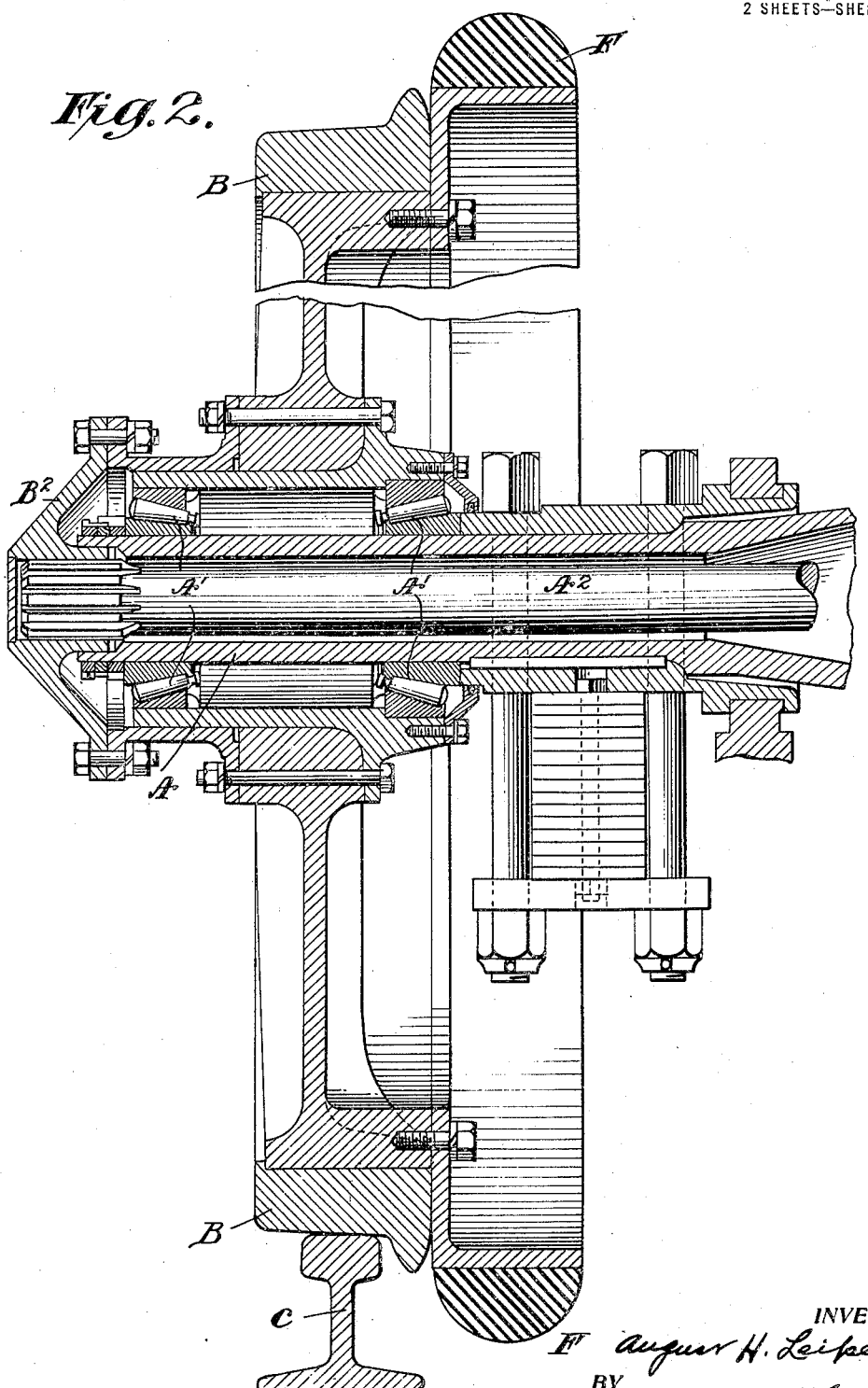

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

DOUBLE-TREAD WHEEL FOR RAIL CARS ADAPTED TO OPERATE AS ROAD VEHICLES.

1,408,813.  Specification of Letters Patent.  Patented Mar. 7, 1922.

Application filed December 20, 1921. Serial No. 523,621.

*To all whom it may concern:*

Be it known that I, AUGUST H. LEIPERT, a citizen of the United States, residing in the borough of Queens of the city of New York, in the State of New York, have invented certain new and useful Improvements in Double-Tread Wheels for Rail Cars Adapted to Operate as Road Vehicles, of which the following is a specification, reference being had to the accompanying drawings, forming a part hereof.

Rail cars propelled by internal combustion motors must satisfy general requirements of both the railway art and the automotive art. Such cars as are now developed to an efficient commercial point may be thought of as evolved by removing the traction wheels of a motor truck and replacing them by flanged car wheels and by replacing the front axle and wheels of a motor truck by a leading truck having flanged car wheels. Automotive practice in the transmission is retained while railway practice in the wheels is satisfied. In accordance with the present invention it is proposed to go a step further and provide a rail-car of the character described which shall be operable as a road vehicle. The invention is realized generally speaking through the improved wheel on which the vehicle is carried, this wheel having a double tread, one of which is of the conventional form for a car wheel and the other of which is of the conventional form for a motor propelled road vehicle. Manufacturing considerations are met, in the preferred construction, by securing these tread sections together and in such relation that neither one interferes with the proper functioning of the other and yet both are available at all times for operation in their intended sphere. The treads are brought into as close proximity as possible although lying in different vertical planes and the load stresses are transmitted through bearings which lie as nearly in the load plane of each tread as the physical relation of parts permits. In the preferred form a flanged car wheel of conventional form has secured to its face a tire rim or carrier on which is supported a tread of suitable form for road work. The treads are of different diameters and being offset with respect to one another operate singly.

Reference is now to be had to the accompanying drawings for a description of one suitable embodiment of the invention, the drawings being intended however to illustrate somewhat conventionally a suitable disposition of the elements to accomplish the intended purposes in accordance with the invention. In the drawings—

Figure 1 is a view in vertical section of an idle wheel of a self-propelled railroad car having a double tread constructed in accordance with the invention to permit the operation of the car either on rails or on the road.

Figure 2 is a view similar generally to Figure 1 but showing a traction wheel of such a car constructed in accordance with the invention.

It has been thought unnecessary to illustrate in the drawings a complete vehicle for operating under the conditions to be met. Such a vehicle in all of its details, excepting the wheels, may be of any approved form. The particular problem to be met arises from a requirement for a self-propelled rail car which may be operated on rails for a distance and, at the terminal, be propelled off the rails on to a road surface for continued operation through any desired zone. Such conditions will present themselves frequently on rail spurs found in rural districts where, upon completion of a run on the rails, it may be desired to propel the vehicle over the roads to more or less remote sections. Under these conditions of operation the vehicle must, of course, satisfy requirements both of the railway and the automotive arts to necessary degrees. Generally speaking commercially satisfactory self-propelled railway cars have the characteristics of a motor vehicle in so far as concerns the power plant, frame and transmission and the characteristics of a rail car so far as concerns the wheel support. For instance, the traction wheels of a motor vehicle are replaced by flanged car wheels which are connected to the live axle sections of the vehicle and the front axle and wheels of the vehicle are replaced by a leading truck supported on little flanged car wheels. Such a type of wheel in part is shown in Figure 1, while a type of traction wheel for a rail car is illustrated in part in Figure 2, these wheels, in each instance, of course, being of improved form in order to provide a double tread adapting the vehicle for operation on either rails or roads. The supporting axle $a$ for the idle wheel carries thereon bearings $a'$ to support revolubly the car wheel $b$ which is flanged, as at $b'$, for operation on the rail head $c$ in the usual manner. The invention is not to be limited, in its broader phases, to the details of construction of the wheel $b$ nor to the particular means for mounting it although, in its more limited phases, such details are deemed to be of importance. In the simplest form of the invention it is proposed to secure an annular angle piece $d$ to the inner face of the wheel $b$ as by means of bolts $e$ which pass through the circular flange $d'$ of the angle piece $d$ and into the wheel $b$ adjacent to the flange $b'$ thereof. The angle piece $d$ includes the annular flange $d^2$ which constitutes a rim section or carrier for a wheel tread $f$ which may be secured thereto. This wheel tread $f$ may, as illustrated, be formed as a solid rubber tire. It will be noted that the tread $f$ is disposed as near to the plane of the tread of the wheel $b$ as the physical relation of parts permits and that both of said treads are well disposed with respect to the bearings $a'$ so that the load stresses will be well borne by them. Further, the diameter of the tread $f$ is greater than the effective diameter of the wheel $b$ so that when the wheel $b$ leaves the rail $c$ and the load passes on to the tread $f$, the wheel $b$ will not engage the road surface nor any ordinary obstacles thereon. Contrariwise, the overall diameter of the tread $f$ is not so great that this tread will engage the rail ties or any ordinary obstacles thereon at a time when the vehicle is operated on the rails, as indicated in the drawings.

The structure shown in Figure 2 is similar to that of Figure 1 in all essential respects and has all of the advantageous characteristics thereof, the most apparent structural differences residing in the adaptation of the wheel B to the conditions to be met at the rear end. For instance, the supporting bearings A' are spaced further apart and the inner bearing actually falls directly between the double treads of the improved wheel. The live axle section $A^2$ extends through the dead axle tube A on which the bearings A' are supported and has its end in splined engagement with a hub cap $B^2$ of the wheel B. The driving torque is thereby communicated to the wheel in the manner commonly practised. The construction and relation of the two treads of the improved traction wheel may be as heretofore described to the end that the rail car may be propelled off the rails and operated on a road surface where its weight is carried by the resilient treads $f$ F.

As pointed out hereinbefore, it is to be understood that changes in details of construction which have to do with matters of design within the skill of the mechanic fall within the scope of the invention provided the results are secured by equivalent means. Further, while reference has been made herein to the usual practice of supporting the front end of a motor vehicle which is to be operated on rails, by means of a car truck, the invention is not to be limited to the use of the improved wheel in any such construction, since it will be understood that railway cars having both front and rear wheels of the motor vehicle replaced by the improved wheels may be operated on rails and on the road, as suggested. Further, the invention is not to be limited to the character of the steering means provided for a vehicle equipped in whole or in part with the improved wheels.

What I claim is:

A wheel for a self-propelled rail car adapted to be operated as a road vehicle, comprising a flanged tread section of conventional form adapted to run on rails and a cushioned tread section of conventional form adapted to run on the road surface, the road tread section being secured removably to the inner face only of the rail tread section, said sections being of such disposition and diameters that the rail tread section supports the road tread section out of engagement with the road bed when the car is operated on rails and the road tread section supports the rail tread section out of engagement with the road surface when the vehicle is operated on the road.

This specification signed this 14th day of December, A. D. 1921.

AUGUST H. LEIPERT.